INVENTOR.
Joseph J. Slomer
BY
Murray A. Gleeson
ATTORNEY

INVENTOR.
Joseph J. Slomer

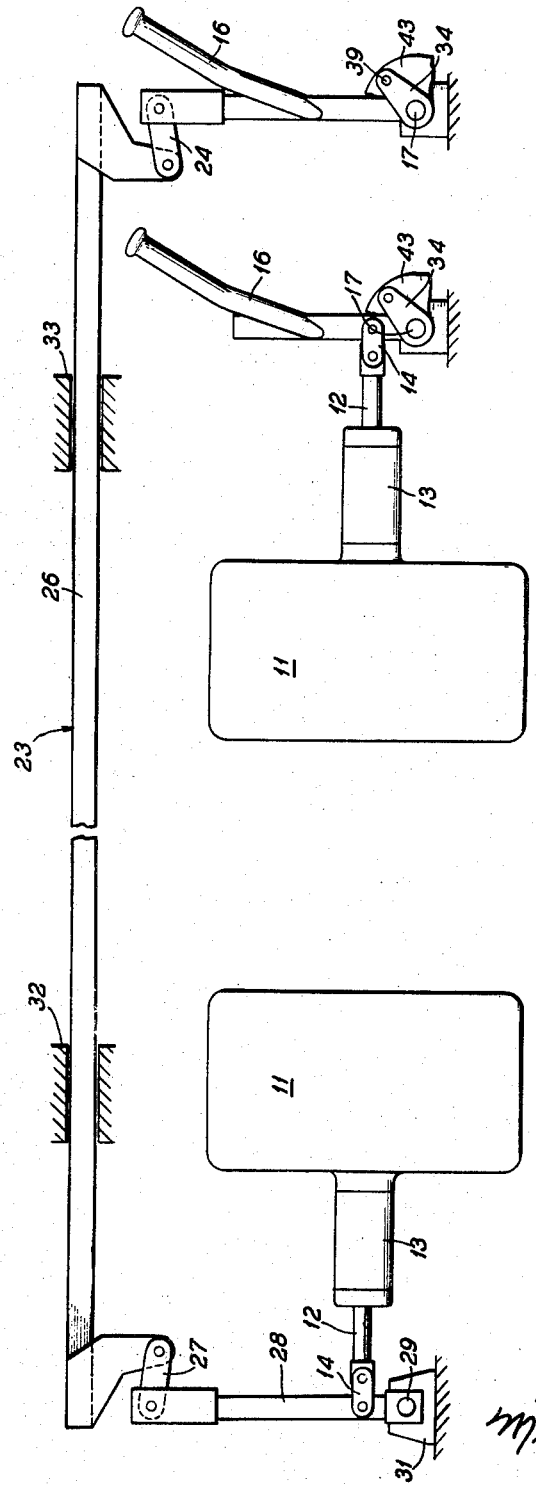

United States Patent Office 2,955,483
Patented Oct. 11, 1960

2,955,483

DUAL CONTROL DEVICE FOR REGULATING THE OUTPUT OF ONE POWER DEVICE WITH RESPECT TO ANOTHER

Joseph J. Slomer, Chicago, Ill., assignor to Goodman Manufacturing Company, Chicago, Ill., a corporation of Illinois Original application Apr. 17, 1956, Ser. No. 578,728. Divided and this application July 23, 1958, Ser. No. 750,326

4 Claims. (Cl. 74—480)

This invention relates generally to fluid pressure systems for supplying motive fluid to the tramming motors of a crawler tread operated vehicle, and to an improved device whereby the volumes of fluid for such motors may be regulated and related to each other.

This application is a division of my co-pending application, Serial No. 578,728, filed April 17, 1956, and now abandoned, for Control Circuit for Fluid Pressure Systems for Crawler Tread Vehicles or the Like.

Structure according to the present invention is especially suited for use with a boring type miner such as is disclosed in Robbins Patent No. 2,705,624, issued April 5, 1955, for Coal Mining Machine with Collapsible Head. Machines of the general type as disclosed in said patent must tram at a relatively high speed from one working point to another, but when in position against the working face the operation of the crawler tread motors is necessary only for good crowding effort and the low speed incident to the advance by the boring arms.

During such latter operation the fluid motors for each crawler tread must operate to give the machine straight line movement, since such machines are generally followed by belt conveying equipment for removal of the material from the working face. Accordingly, the drive motors for the crawler treads must be operated with small amounts of pressure fluid, which amount may vary between the drive motors.

It is a principal object of this invention to provide a fluid pressure control circuit operable over a wide range to supply motive fluid to the tramming motors of a mining machine.

Another object of the invention is to regulate the amount of pressure fluid to each tramming motor within close limits, so that desired straight line movement during low speed crowding may be achieved.

Still another object is to provide a device having a vernier adjustment of its output whereby the motive fluid supplied to each of a pair of tramming motors may be nicely controlled, so as to insure the proper supply of such fluid for crowding of the boring arms against the working face in a mine, and to insure during such crowding straight line movement of the mining machine.

Yet another object is to provide a device for regulating a number of pumps for a desired small output, which device can also be operated to give pump outputs larger than the desired small output.

Other objects and important features of the invention will be apparent from a study of the specification following taken with the drawings, which together show a preferred embodiment of the invention and what is now considered to be the best mode of practicing the principles thereof. Other embodiments may be suggested to those having the benefit of the teachings herein, and such other embodiments are intended to be reserved especially as they fall within the scope and spirit of the subjoined claims.

In the drawings:

Fig. 4 is an elevational view of a linkage for controlling a pair of variable volume pumps seen in Fig. 1, such pumps being located on opposite sides of a crawler tread operated vehicle.

Figure 1:
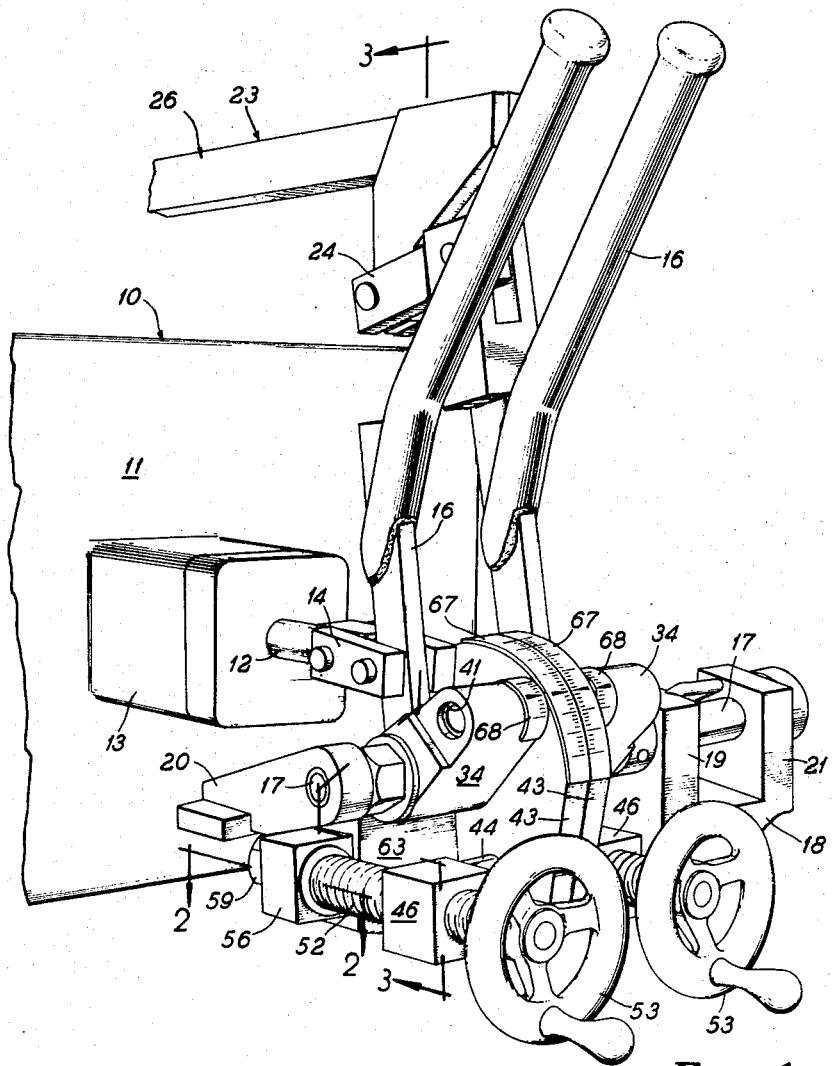
Fig. 1 is a perspective view of a device according to the present invention for manually controlling the output within close limits of a plurality of pumps.

Referring now to the drawings, there is shown in Fig. 4 a pair of pumps 11 of the variable volume type, each having its output controlled and related to the output of the other by the device according to the present invention. Pumps 11 are mounted on opposite sides 10 of a mining machine of the type shown in the aforesaid Robbins patent so that the amount of fluid pumped by the variable volume pumps 11 may be adjusted as desired for the crowding action of the machine against a working face. An operator's station, not shown, is provided to one side of the machine for conjoint operation of the several pumps shown in this application.

Figure 3:
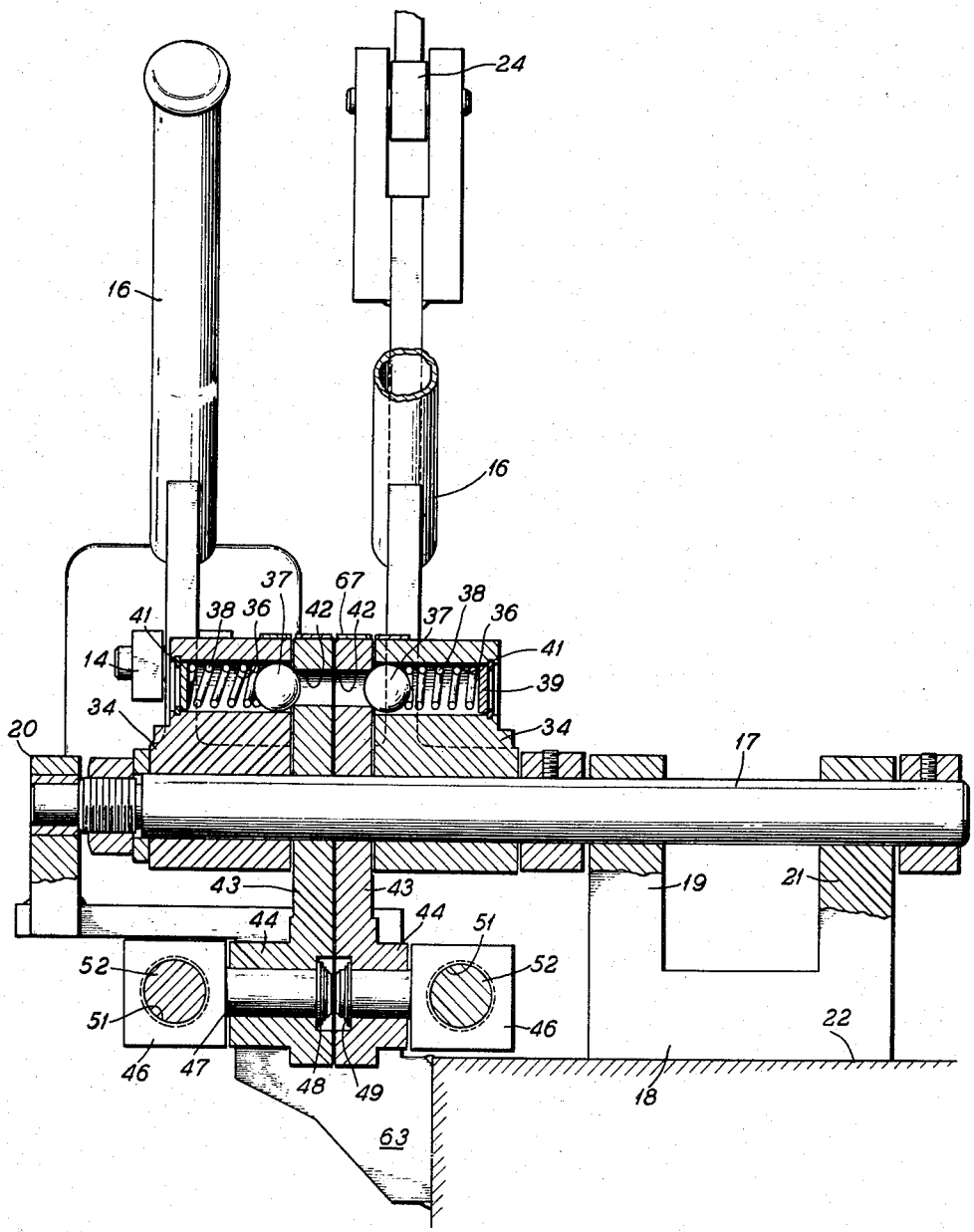
Fig. 3 is a cross section taken substantially along the line 3—3 of Fig. 1 looking in the direction of the arrows.

Each of the pumps has an actuator 12 moving in a guide 13 connected by a linkage 14 to a control handle 16 which is pivoted to a shaft 17 supported in a bifurcated bracket 18 having arms 19 and 21 extending upward from a frame member 22 of the machine, see also Figs. 1 and 3. It will be noted in Fig. 1 that both control handles are arranged to be operated from a single point at one side of the machine. Means are accordingly provided in the form of an auxiliary linkage between a pump at one side of the machine to a control handle 16 at the other side of the machine. The other end of the shaft 17 is additionally supported in a bracket 20 extending from the frame of the machine.

As seen in Figs. 1 and 3, the right hand operating lever 16 is connected by a linkage indicated generally by the reference numeral 23 to operate the variable volume pump 11 on the side opposite the operator. Such a linkage includes a link 24 connected to control handle 16 and to a crossover bar 26 in turn connected to a link 27 and an actuator lever 28 pivotally mounted at 29 to an abutment 31 on the opposite side of the machine. The crossover bar as seen in Figs. 1 and 4 is suitably guided at guides 32 and 33.

Each arm 16 has a hub 34 integral therewith which is arranged to swivel with its arm upon the shaft 17, and as shown in Fig. 3 hub 34 is provided with a recess 36 for a detent ball 37 biased by a spring 38. A washer 39 and a C-ring 41 provide a backing abutment for the spring 38. The detent ball 37 is urged into a circular detent hole 42 in a detent plate 43, the latter being arranged to swivel upon stub shaft 17. The detent plate 43 has integral therewith an annular boss 44 extending therefrom. An internally threaded block or nut 46 having an integral pin 47 is swivelably journaled within the boss 44 and is held in place on boss 44 by washer 48 and C-ring 49.

Figure 2:
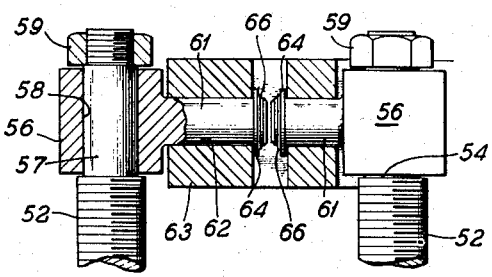
Fig. 2 is a fragmentary sectional view taken along line 2—2 of Fig. 1.

Internal threads 51 of the block 46 engage a screw shaft 52 having a hand wheel 53 at the end thereof. The shaft 52 has a shoulder 54 which bears against a pivoted support block 56, see Fig. 2. The inner end of shaft 52 has a reduced diameter portion 57 journaled at 58 in the block 56 and is held against endwise movement in the block 56 by a nut 59.

A transverse extension 61 is formed integral with the block 56 and is swiveled within a bore 62 formed in a frame extension 63. Extension 61 is held in place to frame extension 63 by washer 64 and C-ring 66. The plate 43 is rotated on the shaft 17 by turning hand wheel 53 to obtain a minor or vernier adjustment at which time the swivelable shaft 61 permits desired up and down freedom of movement of the shaft 52.

The plate 43 has a calibrated scale 67 which cooperates with a vernier scale 68 on the hub 34. When the zero mark on the vernier scale 68 aligns with the zero mark on graduated scale 67, the operator is apprised that the detent ball 37 registers with the detent hole 42.

By rotating the hand wheels 53 the two plates 43 are rocked on the shaft 17. The output from each pump 11 is accordingly regulated for its proper crowding output to crowd the machine in a straight line direction. Normally, in rotating the hand wheel 53 to rotate the plate 43 on the shaft 17, the hub 34 and the operating handle 16 are carried therewith by means of the detent ball 37 and the detent opening 42.

The setting of the two plates 43 with respect to each other may thus be observed by the operator, and moreover, if the machine is trammed away from the working face and then returned thereto for further boring action, the pumps 11 may be returned to the proper output for the boring operation. In demanding output from pump 11 in excess of that needed for crowding alone the arms 16 can be rocked to overcome the detent, and then returned to the previous setting.

The two arms 16 can each be rocked on their shafts 17 to override the detents described to give additional output from the variable volume pump 11. Rocking the arms inward (that is, toward the left in Fig. 1) results in full output from each pump 11 in the forward direction. Contrariwise the machine may be trammed in the reverse direction by moving the arms 16 outward (to the right in Fig. 1), at the same time overriding the detents described.

While the invention has been described in terms of a preferred embodiment thereof, its scope is intended to be limited only by the claims here appended.

I claim as my invention:

1. In a dual control means of a type particularly adapted to relate the output of a plurality of power devices with respect to each other, individual means for adjusting the output of each power device comprising an actuator for each power device shiftable to different positions corresponding to a desired output, an individual hand lever for each actuator, said hand levers being pivoted for movement about a common axis, an adjustable detent plate for each actuator pivoted for movement about the axis of movement of said hand levers, an individual detent connected to each hand lever and adapted to have interengagement with an asociated detent plate, a hand screw for each detent plate for rotatably adjusting the position of said detent and said detent plate for controlling the output of the associated power device, index means on each detent plate whereby the relationship of each of said detent plates with respect to the other may be observed when each of said detents with its asociated detent plate is adjusted for a selected power device output, said detent connection comprising an arm fixedly extending from each hand lever and having an associated detent mounted thereon, said detents and said arms being capable of overriding their asociated detent plates by operation of said hand levers to move the associated actuator to a position corresponding to a power device output different from that determined by the adjustment of said detents and said detent plates.

2. In a dual control means of a type particularly adapted to relate the output of a plurality of power devices with respect to each other, individual means for adjusting the output of each power device comprising an actuator for each power device shiftable to different positions corresponding to a desired output, an individual hand lever for each actuator, said hand levers being pivoted for movement about a common axis, an adjustable detent plate for each actuator pivoted for movement about the axis of pivotal movement of said hand levers, a detent connected with each hand lever and adapted to have interengagement with an associated detent plate, means for rotatably adjusting the positions of said detents and said detent plates for controlling the output of the associated power devices and retaining said detents and detent plates in position, index means on each detent plate whereby the relationship of each of said detent plates with respect to the other may be observed when each of said detents and its associated detent plate is adjusted for a selected power device output, said hand levers moving said detents to override their associated detent plates to move said actuator to a position corresponding to a power device output different from that determined by the adjustment of said detents and said detent plates.

3. In a dual control means of a type particularly adapted to relate the output of a plurality of power devices with respect to each other, individual means for adjusting the output of each power device comprising an actuator for each power device shiftable to different positions corresponding to a desired output, an individual hand lever for operating each actuator, said hand levers being pivoted for movement about a common axis, an adjustable detent plate for each of said actuators, pivoted for movement about the axis of pivotal movement of said hand levers and arranged in side by side relationship, a detent mounted on each hand lever including an arm extending from each hand lever along an adjacent face of an associated detent plate and having a detent member therein biased for interengagement with an adjacent detent plate, an individual hand wheel and adjustment screw for each detent plate for setting each detent plate in a selected position, a separate nut threaded on each adjustment screw and having operative connection with an associated detent plate for rotatably adjusting the positions of said detent plates and said detents, for controlling the output of the associated power devices, index means on said detent plates visible in the vicinity of said hand wheels and lever arms and cooperating with index means on said arms to accommodate the relationship of said detent plates with respect to each other to be observed when each of said detents is in interengagement with its associated detent plate, and said hand levers being operable to override the associated detent plate to give a power device output different from that selected by the detent plate setting attained by the operation of said hand wheel and adjustment screw.

4. In a dual control means of a type particularly adapted to relate the output of a plurality of power devices with respect to each other, individual means for adjusting the output of each power device comprising an actuator for each power device shiftable to different positions corresponding to a desired output, an individual hand lever for operating each actuator, said hand levers being pivoted for movement about a common transverse shaft, an arm extending from each hand lever radially of the axis of said shaft and having a detent member carried thereby and projectable from an inner face thereof, two detent plates pivotally mounted on said shaft in side by side relation between said hand levers and adapted to be interengaged by said detents, an individual hand wheel and adjustment screw associated with each detent plate for adjusting of the setting of each detent plate, an individual nut on each adjustment screw and a pin extending from each nut transversely thereof and having pivotal connection with an associated detent plate for rotatably adjusting the position of each detent plate and its detent interengaged therewith for controlling the outputs of the associated power devices, index means on each detent plate, and cooperating index means on each arm whereby the relationship of each of said detent plates and detents with respect to each other may be observed when each of said detents and its associated detent plate is adjusted for selected power device output, and said hand levers being selectively operable to override the settings of the associated detent plates attained by operation of said hand wheels and adjustment screws, to give a power device output different from that determined by the detent settings attained by said hand wheels and adjustment screws.

References Cited in the file of this patent

UNITED STATES PATENTS

| | | |
|---|---|---|
| 666,875 | Reeves | Jan. 29, 1901 |
| 2,219,844 | Lotter et al. | Oct. 29, 1940 |
| 2,579,959 | Petersen | Dec. 25, 1951 |
| 2,587,376 | Pelly et al. | Feb. 26, 1952 |
| 2,761,391 | Johnston | Sept. 4, 1956 |
| 2,825,238 | Lofthouse | Mar. 4, 1958 |